US007945360B2

(12) United States Patent
Nahapetian

(10) Patent No.: US 7,945,360 B2
(45) Date of Patent: May 17, 2011

(54) COST REDUCTION SYSTEM AND METHOD FOR FLIGHT DATA RECORDING

(75) Inventor: Armen Nahapetian, Glendale, CA (US)

(73) Assignee: Teledyne Technologies Incorporated, Thousand Oaks, CA (US)

( * ) Notice: Subject to any disclaimer, the term of this patent is extended or adjusted under 35 U.S.C. 154(b) by 0 days.

(21) Appl. No.: 12/819,841

(22) Filed: Jun. 21, 2010

(65) Prior Publication Data

US 2010/0256868 A1 Oct. 7, 2010

Related U.S. Application Data

(62) Division of application No. 10/951,005, filed on Sep. 27, 2004, now Pat. No. 7,774,112.

(51) Int. Cl.
*G01M 17/00* (2006.01)

(52) U.S. Cl. .................. 701/35; 701/3; 701/14; 701/29; 370/474; 370/412; 710/30; 710/36

(58) Field of Classification Search .................... 701/35, 701/14, 29, 1, 3; 360/5; 369/21; 348/143; 370/442, 474, 265, 412; 710/30, 36
See application file for complete search history.

(56) References Cited

U.S. PATENT DOCUMENTS 3,209,079 A 9/1965 Skawold
3,581,014 A * 5/1971 Vogel et al. ..................... 369/21
4,409,670 A 10/1983 Herndon et al.
4,625,697 A 12/1986 Hosaka
4,642,775 A 2/1987 Cline et al.
4,646,241 A * 2/1987 Ratchford et al. .............. 701/14
4,660,145 A 4/1987 Hansen
4,686,532 A 8/1987 McAulay
4,729,102 A 3/1988 Miller, Jr. et al.
4,783,744 A 11/1988 Yueh
4,792,860 A * 12/1988 Kuehrle ........................ 358/300
4,804,937 A 2/1989 Barbiaux et al.
4,807,158 A 2/1989 Blanton et al.

(Continued)

FOREIGN PATENT DOCUMENTS

CN 1405037 A 3/2003

(Continued)

OTHER PUBLICATIONS

In-flight observations of long-term single event effect (SEE) performance on X-ray Timing Explorer (XTE) solid-state recorders (SSRs) [SRAM] ; Poivey, C.et al.; Radiation Effects Data Workshop, 2004 IEEE; Digital Object Identifier: 10.1109/REDW.2004.1352904; Publication Year: 2004 , pp. 54-57.*

(Continued)

*Primary Examiner* — Cuong H Nguyen
(74) *Attorney, Agent, or Firm* — K&L Gates LLP

(57) ABSTRACT

A method and system for acquiring aircraft parameters that includes sampling an aircraft parameter during a first sampling period, recording the full value of the aircraft parameter sampled during the first sampling period, then sampling the aircraft parameter during a fixed number of subsequent consecutive sampling periods, and recording the change between the value of the aircraft parameter sampled in the subsequent sampling periods and the value of the aircraft parameter sampled in the prior sampling period. A method and system for constructing a data stream that includes merging a voluntary data stream and the mandatory parameters and storing the merged data stream in a flight data recorder while maintaining the certification of the flight data recorder.

10 Claims, 7 Drawing Sheets

U.S. PATENT DOCUMENTS

| | | | | | |
|---|---|---|---|---|---|
| 4,872,182 | A | | 10/1989 | McRae et al. | |
| 4,926,331 | A | | 5/1990 | Windle et al. | |
| 4,939,652 | A | | 7/1990 | Steiner | |
| 4,955,066 | A | | 9/1990 | Notenboom | |
| 4,987,541 | A | | 1/1991 | Levente et al. | |
| 5,124,915 | A | | 6/1992 | Krenzel | |
| 5,157,615 | A | | 10/1992 | Brodegard et al. | |
| 5,185,700 | A | | 2/1993 | Bezos et al. | |
| 5,283,767 | A | | 2/1994 | McCoy | |
| 5,351,194 | A | | 9/1994 | Ross et al. | |
| 5,359,446 | A | | 10/1994 | Johnson et al. | |
| 5,400,018 | A | | 3/1995 | Scholl et al. | |
| 5,440,544 | A | | 8/1995 | Zinser, Jr. | |
| 5,445,347 | A | | 8/1995 | Ng | |
| 5,463,656 | A | | 10/1995 | Polivka et al. | |
| 5,519,663 | A | | 5/1996 | Harper, Jr. et al. | |
| 5,524,272 | A | | 6/1996 | Podowski et al. | |
| 5,550,738 | A | | 8/1996 | Bailey et al. | |
| 5,652,717 | A | | 7/1997 | Miller et al. | |
| RE35,590 | E | | 8/1997 | Bezos et al. | |
| 5,680,328 | A | | 10/1997 | Skorupski et al. | |
| 5,707,237 | A | | 1/1998 | Takemoto et al. | |
| 5,714,948 | A | | 2/1998 | Farmakis et al. | |
| 5,748,143 | A | | 5/1998 | Melvin, Jr. et al. | |
| 5,761,625 | A | | 6/1998 | Honcik et al. | |
| 5,793,813 | A | | 8/1998 | Cleave | |
| 5,794,145 | A | | 8/1998 | Milam | |
| 5,805,828 | A | | 9/1998 | Lee et al. | |
| 5,826,195 | A | | 10/1998 | Westerlage et al. | |
| 5,844,473 | A | | 12/1998 | Kaman | |
| 5,852,825 | A | | 12/1998 | Winslow | |
| 5,890,079 | A | | 3/1999 | Levine | |
| 5,901,142 | A | | 5/1999 | Averbuck et al. | |
| 5,907,302 | A | | 5/1999 | Melvin, Jr. | |
| 5,919,239 | A | | 7/1999 | Fraker et al. | |
| 5,920,321 | A | | 7/1999 | Owen et al. | |
| 5,926,759 | A | | 7/1999 | Severwright | |
| 5,930,680 | A | | 7/1999 | Lusignan | |
| 5,943,399 | A | | 8/1999 | Bannister et al. | |
| 5,974,349 | A | | 10/1999 | Levine | |
| 5,999,112 | A | | 12/1999 | Omori | |
| 6,047,165 | A | * | 4/2000 | Wright et al. | 455/66.1 |
| 6,048,366 | A | * | 4/2000 | Ellis et al. | 703/8 |
| 6,075,969 | A | | 6/2000 | Lusignan | |
| 6,091,361 | A | | 7/2000 | Davis et al. | |
| 6,091,936 | A | | 7/2000 | Chennakeshu et al. | |
| 6,104,914 | A | | 8/2000 | Wright et al. | |
| 6,107,960 | A | | 8/2000 | Krasner | |
| 6,108,523 | A | | 8/2000 | Wright et al. | |
| 6,148,179 | A | | 11/2000 | Wright et al. | |
| 6,154,636 | A | | 11/2000 | Wright et al. | |
| 6,154,637 | A | | 11/2000 | Wright et al. | |
| 6,160,998 | A | | 12/2000 | Wright et al. | |
| 6,163,681 | A | * | 12/2000 | Wright et al. | 455/66.1 |
| 6,167,238 | A | * | 12/2000 | Wright | 455/66.1 |
| 6,167,239 | A | | 12/2000 | Wright et al. | |
| 6,169,881 | B1 | | 1/2001 | Astrom et al. | |
| 6,173,159 | B1 | | 1/2001 | Wright et al. | |
| 6,181,990 | B1 | | 1/2001 | Grabowsky et al. | |
| 6,199,045 | B1 | | 3/2001 | Giniger et al. | |
| 6,240,341 | B1 | | 5/2001 | Snyder | |
| 6,252,540 | B1 | | 6/2001 | Hale et al. | |
| 6,256,602 | B1 | * | 7/2001 | Ellis et al. | 703/8 |
| 6,292,878 | B1 | | 9/2001 | Morioka et al. | |
| 6,308,044 | B1 | | 10/2001 | Wright et al. | |
| 6,308,045 | B1 | * | 10/2001 | Wright et al. | 455/431 |
| 6,311,060 | B1 | | 10/2001 | Evans et al. | |
| 6,314,416 | B1 | | 11/2001 | Schiefele | |
| 6,317,659 | B1 | | 11/2001 | Lindsley et al. | |
| 6,330,462 | B1 | | 12/2001 | Chen | |
| 6,353,734 | B1 | * | 3/2002 | Wright et al. | 455/98 |
| 6,363,248 | B1 | | 3/2002 | Silverman | |
| 6,363,323 | B1 | | 3/2002 | Jones | |
| 6,487,500 | B2 | | 11/2002 | Lemelson et al. | |
| 6,522,867 | B1 | * | 2/2003 | Wright et al. | 455/66.1 |
| 6,526,337 | B2 | | 2/2003 | Gardner | |
| 6,597,892 | B1 | | 7/2003 | Caldwell, III et al. | |
| 6,650,970 | B2 | | 11/2003 | Odashima et al. | |
| 6,654,386 | B2 | | 11/2003 | Nahapetian et al. | |
| 6,681,158 | B2 | | 1/2004 | Griffith et al. | |
| 6,707,422 | B2 | | 3/2004 | Sheynblat et al. | |
| 6,747,577 | B2 | | 6/2004 | Chakravarty et al. | |
| 6,785,526 | B2 | | 8/2004 | McLain et al. | |
| 6,813,596 | B2 | * | 11/2004 | Ellis et al. | 703/8 |
| 6,816,728 | B2 | | 11/2004 | Igloi et al. | |
| 6,819,982 | B2 | | 11/2004 | Doane | |
| 6,898,492 | B2 | | 5/2005 | De Leon | |
| 6,965,816 | B2 | | 11/2005 | Walker | |
| 6,968,260 | B2 | | 11/2005 | Okada | |
| 7,132,982 | B2 | * | 11/2006 | Smith et al. | 342/456 |
| 7,412,324 | B1 | * | 8/2008 | Bagge et al. | 701/120 |
| RE40,479 | E | * | 9/2008 | Wright et al. | 455/98 |
| 7,774,112 | B2 | * | 8/2010 | Nahapetian | 701/35 |
| 2001/0019966 | A1 | | 9/2001 | Idaka | |
| 2001/0021901 | A1 | * | 9/2001 | Ellis et al. | 703/8 |
| 2002/0035415 | A1 | | 3/2002 | Gardner | |
| 2002/0045973 | A1 | | 4/2002 | Odashima et al. | |
| 2003/0001965 | A1 | * | 1/2003 | Cao et al. | 348/515 |
| 2003/0060941 | A1 | | 3/2003 | Griffith et al. | |
| 2003/0065428 | A1 | | 4/2003 | Mendelson et al. | |
| 2003/0100978 | A1 | * | 5/2003 | Wright et al. | 701/35 |
| 2003/0152145 | A1 | * | 8/2003 | Kawakita | 375/240.12 |
| 2003/0202527 | A1 | | 10/2003 | Nahapetian | |
| 2003/0203734 | A1 | | 10/2003 | Igloi | |
| 2003/0209653 | A1 | | 11/2003 | Feldsine et al. | |
| 2004/0189521 | A1 | * | 9/2004 | Smith et al. | 342/387 |
| 2004/0204801 | A1 | | 10/2004 | Steenberge et al. | |
| 2004/0220748 | A1 | | 11/2004 | Feldsine et al. | |
| 2006/0069477 | A1 | * | 3/2006 | Nahapetian | 701/35 |
| 2007/0152054 | A1 | | 7/2007 | Bonavides et al. | |
| 2010/0256868 | A1 | * | 10/2010 | Nahapetian | 701/35 |

FOREIGN PATENT DOCUMENTS

| | | | | |
|---|---|---|---|---|
| CN | 1746657 | A | | 3/2006 |
| EP | 0407179 | A1 | | 1/1991 |
| EP | 0408094 | B1 | | 1/1991 |
| EP | 0774274 | B1 | | 5/1997 |
| EP | 1179725 | | | 2/2002 |
| EP | 1613535 | B1 | | 1/2007 |
| EP | 1101177 | B1 | | 12/2007 |
| GB | 2276006 | | | 9/1994 |
| GB | 2285688 | A | | 7/1995 |
| JP | 7002022 | A | | 1/1995 |
| JP | 7205898 | A | | 8/1995 |
| JP | 8198197 | A | | 8/1996 |
| JP | 9226694 | A | | 9/1997 |
| JP | 2007067869 | A | * | 3/2007 |
| TW | 220464 | B1 | | 8/2004 |
| WO | WO 94/14273 | | | 6/1994 |
| WO | WO 97/06602 | | | 2/1997 |
| WO | WO 98/27698 | | | 6/1998 |
| WO | WO 98/39699 | | | 11/1998 |
| WO | WO 02/01755 | A1 | | 1/2002 |
| WO | WO 02/08057 | A1 | | 1/2002 |
| WO | WO 03/023322 | A2 | | 3/2003 |
| WO | WO 03/091714 | A1 | | 11/2003 |
| WO | WO 2007/001370 | A2 | | 1/2007 |

OTHER PUBLICATIONS

In-flight observations of long-term single-event effect (SEE) performance on Orbview-2 solid state recorders (SSR) Poivey, C. et al..; Radiation Effects Data Workshop, 2003. IEEE; Publication Year: 2003 , pp. 102-107.*

A "flight data recorder" for enabling full-system multiprocessor deterministic replay; Xu, M. et al..; Computer Architecture, 2003. Proceedings. 30th Annual International Symposium on; Digital Object Identifier: 10.1109/ISCA.2003.1206994; Publication Year: 2003 , pp. 122-133.*

Efficient data storage mechanisms for DAP; Ali, M.S.; Bhagavathula, R.; Pendse, R.; Digital Avionics Systems Conference, 2004. DASC 04. The 23rd; vol. 2 ; Publication Year: 2004 , pp. 11.A.3-11.1-7 vol. 2.*

Advances in flight data acquisition and management systems; McDade, T.M.; Digital Avionics Systems Conference, 1998. Proceedings., 17th DASC. The AIAA/IEEE/SAE; vol. 2; Digital Object Identifier: 10.1109/DASC.1998.739810 Publication Year: 1998 , pp. F12/1-F12/8 vol. 2.*
Enhanced QAR Flight Data Encoding and Decoding Algorithm for Civil Aircraft; Jae-Hyung Kim; Joon Lyou; SICE-ICASE, 2006. International Joint Conference; Digital Object Identifier: 10.1109/SICE.2006.315680; Publication Year: 2006 , pp. 5169-5173.*
Jenkins M D ED—Institute of Electrical and Electronics Engineers, "Integrated voice and data communications for air traffic service applications" Proceedings of the Digital Avionics Systems Conference. Seattle, Oct. 5-8, 1992, New York, IEEE, US, vol. Conf. 11, Oct. 5, 1992, pp. 31-36, XP010106697 ISBN: 0-7803-0820-4.
Rivadeneyra: J.M. Rivadeneyra and J. Miguel. "A communication architecture to access data services through GSM," 7th IFIP/ICCC Conference on Information Networks and Dta Communications, Jun. 15-17, 1998 Aveiro, Portugal. Published Jun. 1998.
ARINC'591: ARINC Characteristic No. 591. Published Jul. 1972.
Spec: TS/SMG-010234QR1, Digital cellular Telecommunications system (Phase 2+); High Speed Circuit Switched Data (HSCSD)—Stage 1 (GSM 02.34 version 5.2.1). Published Jul. 1997.
RFC 791: Internet protocol. Published Sep. 1981.
RFC 793: Transmission control protocol. Published Sep. 1981.
RFC 1661: The point-to-point protocol (PPP). Published Jul. 1994.
FREESCALE: Integrated multiprotocol processor with Ethernet. Published 1995.
RFC 959: File transfer protocol (FTP). Published Oct. 1985.
Hsu W H et al: "Automatic Synthesis of Compression Techniques for Heterogeneous Files" Software Practice & Experience, John Wiley & Sons Ltd. Chichester, GB, vol. 25, No. 10, Oct. 1, 1995, pp. 1097-1116, XP000655539 ISSN: 0038-0644 * p. 1102.*
McDade T M: "Advances in flight data acquisition and management systems" Digital Avionics Systems Conference, 1998. Proceedings., 17TH DASC. The AIAA/IEEE/SAE Bellevue, WA, USA Oct. 31-Nov. 7, 1998, New York, NY, USA, IEEE, US, vol. 2, Oct. 31, 1998.
Hoyme K et al: "ARINC 629 and Safebus*: Data Buses for Commercial Aircraft" Scientific Honeyweller, Honeywell's Corporate. Minneapolis, US, vol. 11, No. 1, Sep. 21, 1991.
Unknown, Air Accidents Investigation Branch: Jan. 2006 G-BVET, unknown date, from http://www.aaib.gov.uk/publications/formal_reports/.
Unknown, Order 7610.4K Special Military Operations, US Department of Transportation, FAA Feb. 19, 2004.
Sampling theory for neuromagnetic detector arrays; Ahonen, A.I.; Hamalainen, M.S.; Illmoniemi, R.J.; Kajola, M.J.; Knuutila, J.E.T.; Simola, J.T.; Vilkman, V.A.; Biomedical Engineering, IEEE Transactions on; vol. 40, Issue 9, Sep. 1993 pp. 859-869; Digital Object Identifier 10.1109/10.245606.
Recognition of temporally changing action potentials in multiunit neural recordings; Mirfakhraei, K.; Horch, K.; Biomedical Engineering, IEEE Transactions on; vol. 44, Issue 2, Feb. 1997 pp. 123-131; Digital Object Identifier 10.1109/10.552242.
Interactive data analysis: the Control project; Hellerstein, J.M.; Avnur, R.; Chou, A.; Hidber, C.; Olston, C.; Raman, V.; Roth, T.; Haas, P.J.; Computer, vol. 32, Issue 8, Aug. 1999 pp. 51-59; Digital Object Identifier 10.1109/2.781635.
Experimentation and Analysis: SigLab/MATLAB Data Acquisition Experiments for Signals and Systems; Cavicchi, T.J.; Education, IEEE Transactions on; vol. 48, Issue 3, Aug. 2005 pp. 540-550; Digital Object Identifier 10.1109/TE.2005.852595.
Modeling, evaluation, and adaptive control of an instrumentation system; Waheed, A.; Rover, D.T.; Mutka, M.W.; Smith, H.; Bakic, A.; Real-Time Technology and Applications Symposium, 1997. Proceedings., Third IEEE; Jun. 9-11, 1997 pp. 100-110; Digital Object Identifier 10.1109/RTTAS. 1997.601348.
A high speed digital recording system for continuous measurements of secondary radar channel activity; Saunders, K.W.; Digital Avionics Systems Conferences, 2000. Proceedings. DASC. The 19th; vol. 2, Oct. 7-13, 2000 pp. 7B4/1-7B4/7 vol. 2; Digital Object Identifier 10.1109/DASC.2000.884926.
System design for automated airborne data acquisition; Blyler, J.E.; Prabhaker, J.C.; Circuits and Systems, 1991., Proceedings of the 34th Midwest Symposium on; May 14-17, 1991 pp. 966-969 vol. 2; Digital Object Identifier 10.1109/MWSCAS.1991.251975.
A Magnetic Field Response Recorder: A New Tool for Measurement Acquisition; Woodard, Stanley E.; Taylor, Bryant D.; Sensors, 2006. 5th IEEE Conference on: Oct. 2007 pp. 789-797; Digital Object Identifier 10.1109/ICSENS.2007.355587.
IEEE Std 1616-2004 IEEE Standard for Motor Vehicle Event Data Recorders (MVEDRs); 2005 pp. 0_1-163.
International Search Report, Application No. PCT/US05/33034.
Written Opinion, Application No. PCT/US05/33034.
David Evans, "Safety: On Camera: Inside and Outside," *Avionics Magazine*, Aug. 1, 2003, printed on Jan. 26, 2005, 6 pages.
Office Action issued in U.S. Appl. No. 09/126,156 dated Feb. 9, 2000.
Notice of Allowability in U.S. Appl. No. 09/126,156 dated Aug. 29, 2000.
Office Action issued in U.S. Appl. No. 10/128,873 dated Jan. 2, 2004.
Notice of Allowance in U.S. Appl. No. 10/128,873 dated Sep. 7, 2004.
Office Action issued in U.S. Appl. No. 10/413,128 dated Mar. 25, 2005.
Office Action issued in U.S. Appl. No. 10/413,128 dated Sep. 21, 2005.
Office Action issued in U.S. Appl. No. 10/413,128 dated Jun. 12, 2006.
Office Action issued in U.S. Appl. No. 10/413,128 dated Nov. 17, 2006.
Office Action issued in U.S. Appl. No. 10/951,005 dated Jan. 8, 2008.
Office Action issued in U.S. Appl. No. 10/951,005 dated Jul. 16, 2008.
Notice of Allowance in U.S. Appl. No. 10/951,005 dated Feb. 10, 2009.
Request for Re-Examination in U.S. Appl. No. 90/006,742 dated Aug. 12, 2003.
Determination—Reexamination Ordered in U.S. Appl. No. 90/006,742 dated Nov. 10, 2003.
Re-Examination Non-Final Office Action in U.S. Appl. No. 90/006,742 dated Jun. 3, 2005.
Notice of Intent to Reissue Reexam Certificate in U.S. Appl. No. 90/006,742 dated Oct. 3, 2005.
Supplementary European Search Report in Application 05858138.0 dated Feb. 19, 2010.
Office Action in U.S. Appl. No. 10/951,005 dated Sep. 8, 2009.
Notice of Allowance in U.S. Appl. No. 10/951,005 dated Mar. 24, 2010.

* cited by examiner

30

| | Parameter (32) | Number of Bits Designated to Record the Actual Value of the Parameter (34) | Physical Range of the Parameter (36) |
|---|---|---|---|
| 38 | Pitch Angle | 9 Bits | ±180 deg. |
| 40 | Roll Angle | 9 Bits | ±180 deg. |
| 42 | Airspeed | 10 Bits | 512 knots |
| 44 | Elevator | 10 Bits | ±50 deg. |
| 46 | Aileron | 10 Bits | ±50 deg. |
| 48 | Control Wheel | 12 Bits | ±85 deg. |
| 50 | Rudder | 10 Bits | ±50 deg. |
| 52 | Radio Altitude | 12 Bits | ±8192 ft. |

FIGURE 2

80

| Parameter (32) | Bits Required to Record the Full Actual Value During the First Sampling Period (62) | Bits Required to Record the Difference Between Samples in the Second Sampling Period and the First Sampling Period (64) | Bits Required to Record the Difference Between Samples in the Third Sampling Period and the Second Sampling Period (66) | Bits Required to Record the Difference Between Samples in the Fourth Sampling Period and the Third Sampling Period (68) |
|---|---|---|---|---|
| 38 Pitch Angle | 9 Bits | 6 Bits | 6 Bits | 6 Bits |
| 40 Roll Angle | 9 Bits | 6 Bits | 6 Bits | 6 Bits |
| 42 Airspeed | 10 Bits | 6 Bits | 6 Bits | 6 Bits |
| 44 Elevator | 10 Bits | 6 Bits | 6 Bits | 6 Bits |
| 46 Aileron | 10 Bits | 6 Bits | 6 Bits | 6 Bits |
| 48 Control Wheel | 12 Bits | 6 Bits | 6 Bits | 6 Bits |
| 50 Rudder | 10 Bits | 6 Bits | 6 Bits | 6 Bits |
| 52 Radio Altitude | 12 Bits | 10 Bits | 10 Bits | 10 Bits |
| | 82 Bits Total | 52 Bits Total | 52 Bits Total | 52 Bits Total |
| 69 | 238 Bits Per Frame | | | |

FIGURE 3

90

| Parameter (32) | Number of Bits Designated to Record the Actual Value of the Parameter (34) | Number of Bits Designated to Record the Sign and Value of the Difference (92) | Maximum Change Supported in 500 ms Sampling Period (94) |
|---|---|---|---|
| 38 Pitch Angle | 9 Bits | 3 Bits | ±0.5 deg. |
| 40 Roll Angle | 9 Bits | 3 Bits | ±1 deg. |
| 42 Airspeed | 10 Bits | 3 Bits | 1.5 knots |
| 44 Elevator | 10 Bits | 3 Bits | ±0.1 deg. |
| 46 Aileron | 10 Bits | 3 Bits | ±0.1 deg. |
| 48 Control Wheel | 12 Bits | 3 Bits | ±3 deg. |
| 50 Rudder | 10 Bits | 3 Bits | ±0.1 deg. |
| 52 Radio Altitude | 12 Bits | 8 Bits | ±15.8 ft. |

FIGURE 4

120

| | 32 | 94 | 96 | 98 | 100 | 102 | 104 | 106 | 108 | | |
|---|---|---|---|---|---|---|---|---|---|---|---|
| | Parameter | Bits Required in Sampling Period 94 | Bits Required in Sampling Period 96 | Bits Required in Sampling Period 98 | Bits Required in Sampling Period 100 | Bits Required in Sampling Period 102 | Bits Required in Sampling Period 104 | Bits Required in Sampling Period 106 | Bits Required in Sampling Period 108 | Total Bits Required in Sampling Frame 112 | |
| 38 | Pitch Angle | 9 Bits | 3 Bits | 3 Bits | 3 Bits | 3 Bits | 3 Bits | 3 Bits | 3 Bits | 30 Bits | 130 |
| 40 | Roll Angle | 9 Bits | 3 Bits | 3 Bits | 3 Bits | 3 Bits | 3 Bits | 3 Bits | 3 Bits | 30 Bits | 132 |
| 42 | Airspeed | 10 Bits | 3 Bits | 3 Bits | 3 Bits | 3 Bits | 3 Bits | 3 Bits | 3 Bits | 31 Bits | 134 |
| 44 | Elevator | 10 Bits | 3 Bits | 3 Bits | 3 Bits | 3 Bits | 3 Bits | 3 Bits | 3 Bits | 31 Bits | 136 |
| 46 | Aileron | 10 Bits | 3 Bits | 3 Bits | 3 Bits | 3 Bits | 3 Bits | 3 Bits | 3 Bits | 31 Bits | 138 |
| 48 | Control Wheel | 12 Bits | 3 Bits | 3 Bits | 3 Bits | 3 Bits | 3 Bits | 3 Bits | 3 Bits | 33 Bits | 140 |
| 50 | Rudder | 10 Bits | 3 Bits | 3 Bits | 3 Bits | 3 Bits | 3 Bits | 3 Bits | 3 Bits | 31 Bits | 142 |
| 52 | Radio Altitude | 12 Bits | 8 Bits | 8 Bits | 8 Bits | 8 Bits | 8 Bits | 8 Bits | 8 Bits | 68 Bits | 144 |
| | 124 | 82 Bits | 29 Bits | 29 Bits | 29 Bits | 29 Bits | 29 Bits | 29 Bits | 29 Bits | 285 Bits | 146 |
| | | 285 Bits Per Frame 112 | | | | | | | | | |

126 128 126

FIGURE 5

COST REDUCTION SYSTEM AND METHOD FOR FLIGHT DATA RECORDING

This application is a divisional of U.S. patent application Ser. No. 10/951,005 filed on Sep. 27, 2004 now U.S. Pat. No. 7,774,112, which is incorporated herein by reference in its entirety.

BACKGROUND

The present invention is directed generally to aircraft avionics flight data recorder systems and methods for accident and incident investigation and, more particularly, to cost reduction methods for flight data recording systems including new data recording methods and methods for building and certifying flexible recording systems without the need for costly re-certification efforts.

With each latest rulemaking by national and international Aircraft Regulatory agencies new requirements are mandated for recording flight data using a Flight Data Recorder System (FDRS). In one embodiment the FDRS, consists of the Flight Data Recorder (FDR) and the Flight Data acquisition unit (FDAU). This system is used for recording data associated with various aircraft parameters. The FDRS is primarily an investigative tool for reconstructing and evaluating the performance of an aircraft prior to and during an accident or incident. During an investigation, the data recorded in the FDR is used to better assist the investigation of such accidents and incidents.

The FDAU acquires and the FDR records aircraft parameters at a predetermined sampling rate and may, in some instances, filter the recorded data. The FDRS may be used to record data associated with an aircraft's flight control systems such as, for example, pitch angle, roll angle, airspeed, elevator position, aileron position, control wheel position, rudder position, and radio altitude, among other types of aircraft data and/or parameters. For example, the FDRS may be used to record event signals that may be associated with one or more aircraft parameters such as engine hydraulic system data from a pressure switch or sensor, brake pressure data from a pressure sensor, aircraft ground/air speed data, flight number/leg data, aircraft heading data from an Inertial Reference Unit (IRU) and/or Electronic Flight Instrument System (EFIS), weight-on-wheels or weight-off-wheels data from an air/ground relay, Greenwich Mean Time (GMT) from the captain's clock, and other similar event signals such as door open/closed sensors, and the like.

The FAA and National Transportation Safety Board (NTSB) often issue safety recommendations and requirements for new regulations and frequently includes mandates for sampling and recording parameters at increasingly higher sampling and recording rates. These higher sampling and recording mandates generally increase the volume of recorded data beyond the capacity of an aircraft's existing FDR and often requires the replacement of the FDR or the complete FDR system. Present implementations of FDRS, however, treat the sampling rates and recording rates as one requirement. Thus, any increase in the sampling rate results in a direct increase in the recording rate and thus a direct increase in the volume of storage required in the FDR to store the data, and a direct increase in the bandwidth of the information channel between the FDAU and the FDR.

Non-deterministic and deterministic data compression are ways to decrease the overall storage requirements of the FDR. Conventional non-deterministic data compression systems and methods, however, are prone to circumstances where the data compression produces little or no advantage. Furthermore, it is difficult if not impossible to calculate the required minimum storage capacity based on non-deterministic data compression techniques to satisfy all possible changes in the data. This is because it is difficult to determine ahead of time how much the data will be compress, and thus is difficult to provide a FDR with a minimum storage capacity to handle changes in the data. Without the ability to calculate the minimum storage requirements ahead of time, a mandatory flight data recording system would not benefit fully simply by this data compression alone and would be forced to allocate minimum storage for the worst-case scenario. Furthermore, some conventional non-deterministic data compression methods require a certain amount of data to be buffered before compression can be applied. Conventional non-deterministic compression techniques, therefore, fail to meet the requirements imposed on FDRS where the data must be transferred to crash protected media within fractions of a second after being sampled. Thus, conventional non-deterministic compression techniques may free up little or no storage volume for recording the additional data at the higher sampling rates.

Conventional deterministic methods may be used to reduce the volume of recorded data by packing the aircraft parameters into words, bus-switching the parameters, and dropping the less significant bits of parameters. Although these conventional deterministic methods reduce the required volume of storage, used alone they do not provide an adequate solution to the increased storage requirements.

Thus, there is a need in the art for a system and method for recording aircraft related data at the mandated higher sampling rates without the need for a proportional increase in the bandwidth and storage capacity of and without the need to completely replace an existing FDR, which may be costly to do in either case. Accordingly, there is a need in the art for systems and methods that can accommodate the mandated higher sampling rates that utilize the existing FDR data storage capacity for recording the higher volume of data produced by the higher sampling rates. Such systems and methods might prevent the costly upgrade of the FDR hardware and thus lead to significant cost savings.

The EUROCAE document ED112 provides a likely basis for any European rulemaking with respect to recording flight data for accident and/or incident investigation. Section 1-1.3.5 of this document provides that it is highly desirable to have voluntary parameters recorded alongside the mandatory parameters on the crash protected FDR. The recording system for the mandatory parameters is subject to costly certification efforts anytime a change is made. On the other hand, the recording of voluntary parameters merely requires some flexibility in allowing operators to make changes as needed, sometime even on a daily basis. Accordingly, there is need in the art for a system and method to address regulatory requirements, such as those described in the ED112 document, that provide the requisite flexibility for recording voluntary parameters while simultaneously protecting the certification of the mandatory recording. Such new system and method for building and certifying a mandatory flight data recording system would provide the flexibility of permitting changes to be made to the recorded parameter set without the need for re-certifying the mandatory parameter recording aspect of the recording system.

It is known in the art to merge data recording streams in situations where it is necessary to certify the recorded flight data, or where the merged stream has been certified as a fixed non-flexible set of parameters comprising the flight data. There is a need in the art, however, for a system and method of injecting of an uncontrolled and uncertified voluntary recorded flight data stream into the mandatory and certified recorded flight data stream to add some flexibility to the certification of the mandatory recording function.

SUMMARY

In one embodiment, the present invention relates to a method for acquiring aircraft parameters that includes sampling an aircraft parameter during a first sampling period; recording the full value of the aircraft parameter sampled during the first sampling period; sampling the aircraft parameter during a limited but fixed number of subsequent sampling periods, wherein the subsequent sampling periods consecutively follows the first sampling period; and recording the change in value of the aircraft parameter sampled in the subsequent sampling periods from the value of the aircraft parameter sampled in the prior sampling period. Then repeating the above sequence (a frame) until the recording stops. The change in values may be represented by the difference of the values, the ratio of values or some other function of the two values.

In another embodiment, the present invention provides a system for acquiring aircraft parameter data that includes a data acquisition unit; and a flight data recorder in communication therewith; wherein a sampling function of the data acquisition unit is disassociated from a recording function of the flight data recorder.

In yet another embodiment, the present invention provides a system for recording aircraft parameter data that includes a voluntary data acquisition unit or function; a mandatory data acquisition unit in communication therewith for receiving a voluntary data stream and combining it with the mandatory streams into a single merged data stream; and a flight data recorder in communication with the mandatory acquisition unit, wherein the flight data recorder is for storing the merged data stream; wherein merging the voluntary and mandatory data streams does not adversely affect the mandatory data stream and does not requires the re-certification of the flight data recorder.

In still another embodiment, the present invention provides a method for constructing a data stream that includes merging a voluntary data stream and a mandatory data stream; storing the merged data stream in a flight data recorder; and maintaining the certification of the flight data recorder.

These and various other features of the embodiments of the present invention will become apparent to those skilled in the art from the following description and corresponding drawings. As will be realized, the present invention is capable of modification without departing from the scope of the invention. Accordingly, the description and the drawings are to be regarded as being illustrative in nature, and not as being restrictive.

BRIEF DESCRIPTION OF THE DRAWINGS

Various embodiments of the present invention will be described in conjunction with the following figures, wherein like parts are referenced by like numerals throughout the several views and wherein:

FIG. 2 is one embodiment of a chart illustrating a sample application based on actual aircraft parameter recording rates of a B767 aircraft;

FIG. 3 is one embodiment of a chart illustrating the distribution of bits over a four second sampling frame;

FIG. 4 is one embodiment of a chart illustrating the distribution of aircraft parameters and their change;

FIG. 5 is one embodiment of a chart illustrating the allocation of bits for each sampling period for each aircraft parameter over the entire sampling frame;

DESCRIPTION

Figure 1:
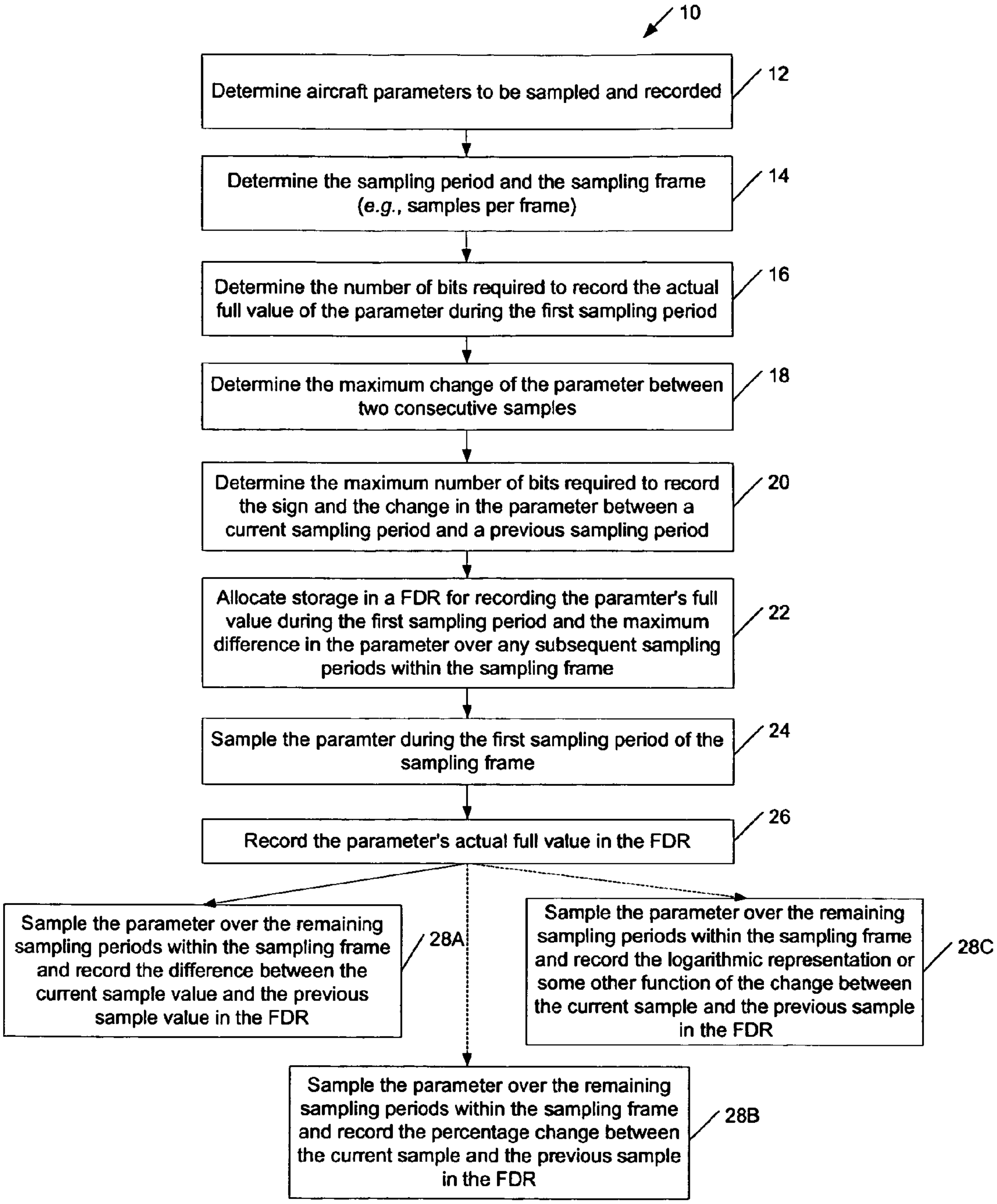
FIG. 1 is one embodiment of a flow diagram illustrating a method for acquiring aircraft data parameters.

It is to be understood that the figures and descriptions of the present invention are simplified to illustrate elements that are relevant for a clear understanding of the present invention while eliminating, for purposes of clarity, other elements found in a conventional aircraft flight data recording systems and methods. It can be recognized that other elements may be desirable and/or required to implement certain aspects of the present invention. A discussion of such elements is not provided, however, where the elements are well known to those skilled in the art and does not facilitate a better understanding of the present invention.

Various embodiments of an aircraft parameter data recording system and method are provided where the sampling function is disassociated with the data recording function. Thus, aircraft parameters may be sampled at increasingly higher sampling rates, as may be mandated by regulatory agencies, without proportionally increasing the volume of recorded data, which may otherwise require an upgrade or a complete replacement of a FDR.

In one embodiment, a system and method are provided wherein aircraft related information is acquired and recorded over predetermined time units. As discussed previously, the aircraft related information may include, for example, data associated with an aircraft's flight control systems such as, for example, pitch angle, roll angle, airspeed, elevator position, aileron position, control wheel position, rudder position, and radio altitude, among other types of aircraft data and/or parameters. For example, the FDRS may be used to record event signals that may be associated with one or more aircraft parameters such as engine hydraulic system data from a pressure switch or sensor, brake pressure data from a pressure sensor, aircraft ground/air speed data, flight number/leg data, aircraft heading data from an Inertial Reference Unit (IRU) and/or Electronic Flight Instrument System (EFIS), weight-on-wheels or weight-off-wheels data from an air/ground relay, Greenwich Mean Time (GMT) from the captain's clock, and other similar event signals such as door open/closed sensors, and the like.

Due to the repetitive nature of sampling and recording, where the repetition period is a fixed number of seconds called a "Frame," aircraft parameter data may be acquired and recorded over a predetermined number of samples "S" during each frame. The required bit length of each sample is determined by the type of parameter being sampled. For each sample of a predetermined parameter, therefore, a predetermined number of bits "B" are acquired and stored. Conventional FDR systems generally record, in each frame, a number of bits equal to the product of the required bit length "B" of the sampled parameter and the number of samples "S" per frame. Therefore, during a predetermined sampling frame, conventional FDR systems record "SB" bits, and the FDR requires a corresponding storage volume to record the maximum value that the sampled parameter may attain during any of the sampling periods over the sampling frame.

In one embodiment of the present invention, the total number bits to be recorded over a frame is:

$$\text{Frame Bit Allocation}=B+b(S-1) \quad (1)$$

Where "b" is the number of bits required to record the maximum possible change between a current sampled value and a previously sampled value where "b<B" and "S" is the number of samples per frame.

The description now turns to embodiments of an aircraft parameter data recording system and method wherein the aircraft parameter data sampling function is disassociated with the data recording function. Accident and incident investigators to reconstruct the behavior of various aircraft parameters by playing back the aircraft data stored in a FDR. The required fidelity (e.g., resolution) of the playback of an aircraft parameter is determined by recording a predetermined minimum number of bits per sampling period of the aircraft parameter and by recording a predetermined number of samples per unit time (i.e., the sampling frame). The unit of time for the sampling period or the sampling frame may be "one second," "half second period," "hour," and so on. For example, if an aircraft parameter requires a resolution of "B" bits per sample, and "S" samples per frame, a conventional aircraft data recording system needs to allocate a minimum storage capacity of "SB" bits per frame to record all the sampled data.

The recording method according to various embodiments does not require buffering of the recorded aircraft data to reduce the allocated storage space. Rather, the method, provides a determinate amount of compression by sampling an aircraft's parameter and independently recording the sampled value of the aircraft's parameter, so that the two functions (e.g., sampling and recording) are disassociated. Although the aircraft parameter may be sampled at a rate of "SB" bits per unit time, it is recorded in accordance with the following method.

FIG. 1 is a flow diagram 10 that illustrates a method for acquiring aircraft data parameters where the sampling function is disassociated from the data recording function. In one embodiment, the method may be used to acquire and record aircraft data parameters 32 (e.g., see FIG. 2) over predetermined time units. For example, as described in more detail below, in one embodiment the aircraft data parameters 32 may be sampled and recorded in one second sampling periods over a four second frame. In one embodiment, the aircraft parameters may be sampled and recorded in 500 ms sampling periods 94, 96, 98, 100, 102, 104, 106, 108 (see FIG. 5) over a four second frame 112 (see FIG. 5). At block 12, the aircraft parameters to be sampled and recorded is determined. At block 14, the sampling periods and the sampling frame are determined and the aircraft acquisition/recording system is set-up such that the aircraft parameters are sampled over a plurality of sampling periods within the sampling frame. At block 16, the number of bits, or length, required to record the actual full value of each aircraft parameter during the first sampling period of the frame are determined. At block 18, the maximum change that each parameter may undergo within each of the remaining sampling periods within the sampling frame are determined. At block 20, after determining the maximum possible change of each parameter within the sampling period, the number of bits to record a representation of the maximum change between the value of the parameter between the current sampling period and the previous sampling is determined. At block 22, a predetermined volume of storage is allocated in a FDR for recording the parameter's full value in the first sampling period, and for recording the maximum change in the parameter over the subsequent sampling periods within the sampling frame. In one embodiment, equation (1) may be used to determine the allocation of bits per frame for a given parameter 12.

In operation, at block 24, a first sample of the aircraft parameter is taken during the first sampling period (e.g., one second, 500 ms, and the like). At block 26, the parameter's sampled value is recorded in its entirety in a FDR, for example. At block 28A, following the initial sampling period, the parameter is sampled over the subsequent sampling periods within the sampling frame. Now, however, only the difference in value between a current sample and a previous sample is recorded. Recording only the difference in value between consecutive samples instead of recording the parameter's full value requires a much smaller storage allocation in the FDR. Those skilled in the art will appreciate that the storage usage depends on the maximum change that a parameter may undergo within a given sampling period. In one embodiment, at block 28B, a percentage change (e.g., increase or decrease) in value of the parameter between consecutive samples may be recorded. In another embodiment, at block 28C, a logarithmic representation or another function of the difference in value between consecutive samples may be recorded.

A smaller number of bits can thus be allocated for recording the actual change (difference and/or the percentage change and/or the logarithmic representation of the difference and/or some other function of the change) of any samples between consecutive sampling periods rather than allocating storage for the full value as is required with conventional mandatory flight data recording systems. The number of bits for recording a parameter's change in value between consecutive samples is smaller because there are physical limitations with respect to how much the aircraft parameters can possibly change during a fixed sampling period. Accordingly, if the number of bits required to record the change between a current value and a previous value is "b", where "b<B", then the number of bits per frame required to store the samples may be represented, for example, by equation (1) as "B+b(S−1)", rather than "SB", the number of bits required for conventional recording systems. This method reduces the FDR's storage volume requirements and, therefore, an existing FDR may still be used in applications where a parameter's sampling rate is increased to improve overall performance or because of regulatory mandates. Utilization of existing FDR hardware provides a cost savings to the aircraft operator and/or owner.

FIG. 2 is a chart 30 that illustrates a sample application based on actual aircraft parameter recording rates of a B767 aircraft. The chart 30 illustrates the parameters 32 to be recorded, the number of bits or length 34 required to record the maximum actual value of the parameter 32 over the sampling period, and the physical range 36 of the parameter 32. Some of the parameters 32 illustrated in the chart 30 may be slated for increased sampling rates by accident investigators and regulatory agencies. In this particular configuration of the aircraft, the number of samples per unit time "S" is four and the sampling period is one second. Thus, the parameters 32 are sampled over a one second sampling and total of four samples are recorded, for example. The total number of samples per frame "S" will vary according to the particular application. The parameters 32 include, but are not limited to: pitch angle 38, roll angle 40, airspeed 42, elevator 44, aileron 46, control wheel 48, rudder 50, and radio-altitude 52, for example. In the illustrated example, the pitch angle 38 requires the allocation of 9 bits to record the parameter's maximum actual value over the sampling period. The roll angle 40 requires 9 bits, the airspeed 42 requires 10 bits, the elevator 44 requires 10 bits, the aileron 46 requires 10 bits, the control wheel 48 requires 12 bits, the rudder 50 requires 10 bits, and the r-altitude 52 requires 12 bits, for example. The ranges for each of these parameters 32 is as follows: the pitch angle 38 is ±180°, the roll angle 40 is ±180°, the airspeed 42 is 512 knots, the elevator 44 is ±50°, the aileron 46 is ±50°, the control wheel 48 is ±85°, the rudder 50 is ±50°, and the radio-altitude 52 is ±8192 ft., for example.

FIG. 3 is a chart 80 that illustrates one example of the distribution of bits 62, 64, 66, 68 over the four second sampling frame in accordance with one embodiment of the present invention. As discussed previously, the method provides that the number of bits 62 allocated for the first one second sampling period is the number of bits required to record the full value of the sampled parameter 32. The samples taken during the subsequent sampling periods within the four second frame, however, require only the allocation of the number of bits needed to store the actual difference between the value of a current sample and the value of the previous sample rather than recording the parameter's 32 full actual value. For example, during the first one second sampling period, the number of bits 62 to be allocated is the number of bits required to store the full value of the sampled parameter 32. During the subsequent, second, one second sampling period, the number of bits 64 to be allocated for storage is only what is required to store the maximum possible change in value that the parameter 32 may undergo during the second sampling period relative to the first sampling period. Likewise, during the subsequent, third, one second sampling period, the number of bits 66 to be allocated for storage is only what is required to store the maximum possible change in value that the parameter 32 may undergo during the third sampling period relative to the second sampling period. Similarly, during the subsequent, fourth, one second sampling period, the number of bits 68 to be allocated for storage is only what is required to store the maximum possible change in value that the parameter 32 may undergo during the fourth sampling period relative to the third sampling period. Thus, only a fraction of the available FDR storage volume needs to be allocated to record the eight parameters 32 over the four second frame. In this example, the total number of bits to be allocated for the entire frame is 238 as shown in cell 69. Although in this example the change in the number of bits required to record is expressed as the difference between samples, as discussed previously, the actual change in terms of difference and/or the percentage change and/or the logarithmic representation of the difference and/or some other function of the change may be utilized or determined without departing from the scope of the present invention.

FIG. 4 is a chart 90 that illustrates the distribution of aircraft parameters 32, the number of bits designated to record the actual parameter value, i.e., the bit length 34, the number of bits designated to record the sign and the value of the difference 92 between consecutive 500 ms sampling periods 94, 96, 98, 100, 102, 104, 106, 108, and the maximum change 110 that the parameter 32 can support in a 500 ms sampling period (i.e., at twice the sampling rate of one second for the example shown in chart 80 of FIG. 3). To double the sampling rate and yet allow for larger changes than those represented in the chart 90, more bits may be budgeted or, alternatively, a non-linear scale may be used to record the changes. In this example where the sampling rate is doubled to one sample per 500 ms over the four second frame conventional methods would require the allocation of 656 bits over the four second frame. As shown below, however, one embodiment of the method requires only the allocation of 285 bits over the four second frame. This reduced bit allocation value may be achieved because there is a physical limitation of the maximum change a parameter 32 may undergo from sample to sample.

In the example illustrated in the chart 90, the number of bits to be allocated for the for storing the maximum value of each parameter 32 within the first 500 ms sampling period 94 is: nine bits for the pitch angle 38 and the roll angle 40 parameters; ten bits for the airspeed 42, elevator 44, aileron 46, and rudder 50 parameters; and twelve bits for the control wheel 48 and the radio-altitude 52 parameters. Subsequent 500 ms sampling periods 96, 98, 100, 102, 104, 106, 108, however, require the designation of only the number of bits needed to record the maximum possible change in the physical parameter over each 500 ms period relative to the previous sampling period. For each of these parameters 32, the number of bits designated to record the sign and the value of the difference in the measured parameter relative to the previous sampling period is: three bits for the pitch angle 38, roll angle 40, airspeed 42, elevator 44, aileron 46, control wheel 48, and rudder 50 parameters; and eight bits for the radio altitude 52 parameter. During each 500 ms sampling period 96, 98, 100, 102, 104, 106, 108 the maximum change of the parameters 32 is: ±0.5° for the pitch angle 38; ±1.0° for the roll angle 40; ±1.5 knots for the airspeed 42; ±0.1° for the elevator 44; ±0.1° for the aileron 46; ±3° for the control wheel 48; ±0.1° for the rudder 50; and ±15.8 ft. for the radio altitude 52. Accordingly, after the actual value is initially recorded in the first 500 ms sampling period 94, the FDR only needs to allocate the number of bits necessary to record the difference in the maximum change in any of the parameters 32 over the remaining 500 ms sampling periods 96, 98, 100, 102, 104, 106, 108.

FIG. 5 is a chart 120 that illustrates the total number of bits to be allocated over the sampling frame 112. At double the sampling rate of two samples per second (i.e., one sample every 500 ms) the number of bits required to store all eight parameters 32 over the four second frame 112 is 285 bits, for example. At a 500 ms sampling period and a four second frame "S", the number of samples taken by the acquisition system is eight samples per frame 112. In the first 500 ms sampling period 94 of the frame 112, the number of bits to be allocated is the number of bits required to store the parameter's 32 full value. In the subsequent seven sampling periods 96, 98, 100, 102, 104, 106, 108 only the number of bits required to record the sign and the value difference of the parameter 32 that is supported within the 500 ms sampling period relative to the previous sampling period is recorded. In the first 500 ms second sampling period 94, the number of bits 124 to be allocated is 82 and that corresponds to the bits required to represent the parameter's 32 full value. The number of bits to be allocated to record each parameter's 32 full value during the first 500 ms sampling period 94 is: nine bits for the pitch angle 38 and the roll angle 40 parameters; ten bits for the airspeed 42, elevator 44, aileron 46, and rudder 50 parameters; and twelve bits for the control wheel 48 and the radio altitude 52 parameters, for a total of 82 bits as shown in cell 124. In the subsequent 500 ms sampling periods 96, 98, 100, 102, 104, 106, 108 the number of bits to be allocated for each parameter 32 to record the sign and the value of the difference in the measured parameter relative to the previous sampling period is: three bits for the pitch angle 38, roll angle 40, airspeed 42, elevator 44, aileron 46, control wheel 48, and rudder 50 parameters; and eight bits for the radio altitude 52 parameter, for a total of 29 bits as shown in each cell 126.

Thus, the total number of bits to be allocated for the entire four second frame 112, as shown in cell 128, is:

$$\text{Total Bits per Frame}=82+29(7)=285\text{ bits.} \quad (2)$$

As discussed previously, equation (1) also may be used to arrive at the total number of designated bits for each parameter for the entire four second frame 112:

$$B+b(S-1) \quad (1)$$

Where "S" is the predetermined number of samples per frame, "B" is the predetermined number of bits for recording the full actual value of the parameter, and "b" is the number of bits required to record the difference between a current value and a previous value, and where "b<B". In the example illustrated in FIG. 5, chart 120, for the pitch angle 38 parameter:

$$B=9;$$

$$b=3;\text{ and}$$

$$S=8.$$

Applying these values into equation (1) over the four second sampling frame 112 at a sampling period of 500 ms yields:

$$9+3(8-1)=30\text{ bits.}$$

This is less than the conventional number of bits "SB" required to store the same parameter over the same four second sampling frame:

$$SB=4*9=36\text{ bits.}$$

FIG. 5 also illustrates the allocation of bits for each sampling period 94, 96, 98, 100, 102, 104, 106, 108 for each aircraft parameter 32 over the entire sampling frame 112. For example, the total number of bits to be allocated are: 30 bits for the pitch angle 38 and the roll angle 40 parameters as shown at cells 130, 132, respectively; 31 bits for the airspeed 42, elevator 44, aileron 46, and rudder 50 parameters as shown at cells 134, 136, 138, and 142, respectively; 33 bits for the control wheel 48 parameter as shown at cell 140; and 68 bits for radio altitude 52 parameter as shown at cell 144. The total number of bits to be allocated for the frame is the sum of all the bits required to store each individual parameter 32, which is 285.

Furthermore, embodiments of the present invention provide a system and method for combining voluntary and mandatory aircraft parameters. The voluntary data includes data that is flexible and unspecified by government agencies and/or regulations. The mandatory data includes data that must be recorded in a FDR in accordance with current regulations and government agency mandates. Accordingly, the description now turns to the embodiments of the present invention that provide a system and method for combining the voluntary and mandatory aircraft data in such a way as to not adversely affect the certification of the mandatory data streams recorded in the FDR. The certifiable mandatory recording system merges (interlaces) the incoming voluntary data stream regardless of its content with the mandatory parameters, thus, the flexible and unspecified data voluntary data stream is included in the certification of the mandatory FDR system. Because the mandatory parameters and the components of the voluntary stream have fixed, predetermined locations in the merged stream to the FDR, the merger, cannot adversely affect the certification of the mandatory data stream and the system does require re-certification of the FDR when any changes are made to the recorded voluntary parameter set. The merged data stream may be routed to a voluntary data recorder as well as a certified (e.g., mandatory) FDR.

Figure 6:
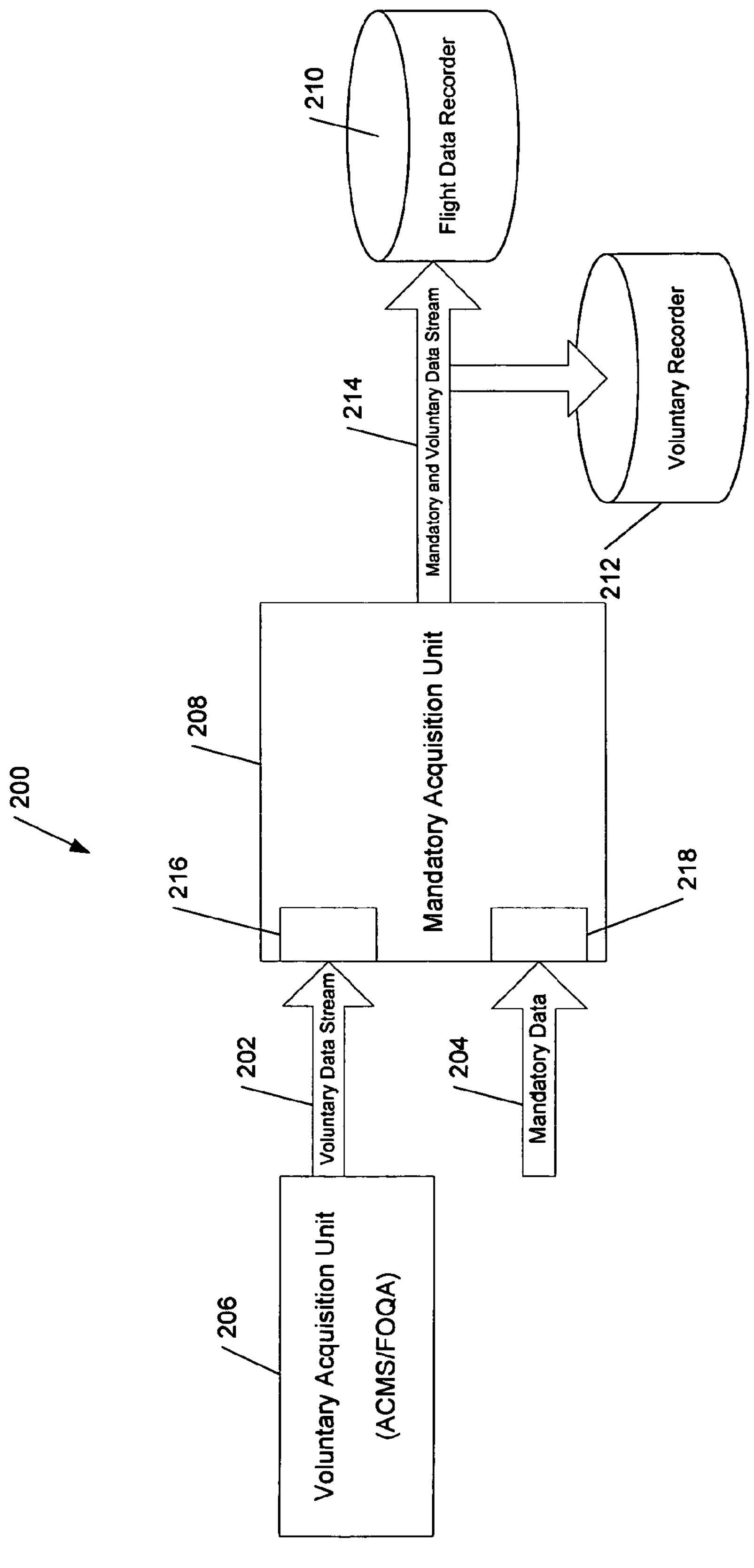
FIG. 6 illustrates one embodiment of a certifiable mandatory recording system for combining a voluntary data stream and a mandatory data stream.

FIG. 6 illustrates one embodiment of a certifiable mandatory recording system 200 for combining a voluntary data stream 202 and the mandatory data 204. The system 200 provides flexibility in recording aircraft parameters included in the voluntary data stream 202 alongside other aircraft parameters included in the mandatory data 204. The system 200 also provides the flexibility of allowing changes to the voluntary data stream 202 parameters without the need for re-certifying the FDR 210, for example.

The certifiable mandatory recording system 200 comprises a voluntary acquisition unit 206, such as, for example, a ACMS/FOQA acquisition unit, for acquiring a voluntary data stream 202, a mandatory acquisition unit 208 for receiving both the voluntary data stream 202 and the mandatory data 204. The system 200 also comprises a flight data recorder 210 (FDR) and in one embodiment also may comprise an optional voluntary recorder 212. The voluntary data stream 202 is acquired by the voluntary acquisition unit 206 and is fed to a first port 216 of the mandatory acquisition unit 208. The mandatory data 204 is acquired from the ports 218 of the mandatory acquisition unit 208. A merged data stream 214 comprising both the mandatory and the voluntary data 202, 204, respectively, is output by the mandatory acquisition unit 208 and is fed to the FDR 210. In one embodiment the merged data stream 214 also may be fed to the optional voluntary recorder 212.

In one embodiment, the mandatory data acquisition unit 208 includes voluntary data port(s) 216 and mandatory port(s) 218 (e.g., DITS429, ARINC717 and the like) dedicated to receive voluntary and mandatory data streams 202, 204, for example. In one embodiment, the first port 216 may be dedicated for receiving the voluntary data stream 202 from the voluntary acquisition unit 206 and the mandatory ports 218 may be dedicated for receiving the mandatory data 204 from various sensors and measurement devices used to monitor mandatory aircraft parameters. The voluntary and mandatory data 202, 204 received at the input ports 216, 218 are interlaced by the mandatory acquisition unit 208. The merged data stream 214 is provided to the FDR 210 even though part of it is un-identified at certification time. As part of the certification effort, the system 200 is able to merge the voluntary data stream 202 (regardless of content) with the mandatory data 204 without causing any adverse side effects to the recorded data (e.g., the merged data stream 214).

Figure 7:
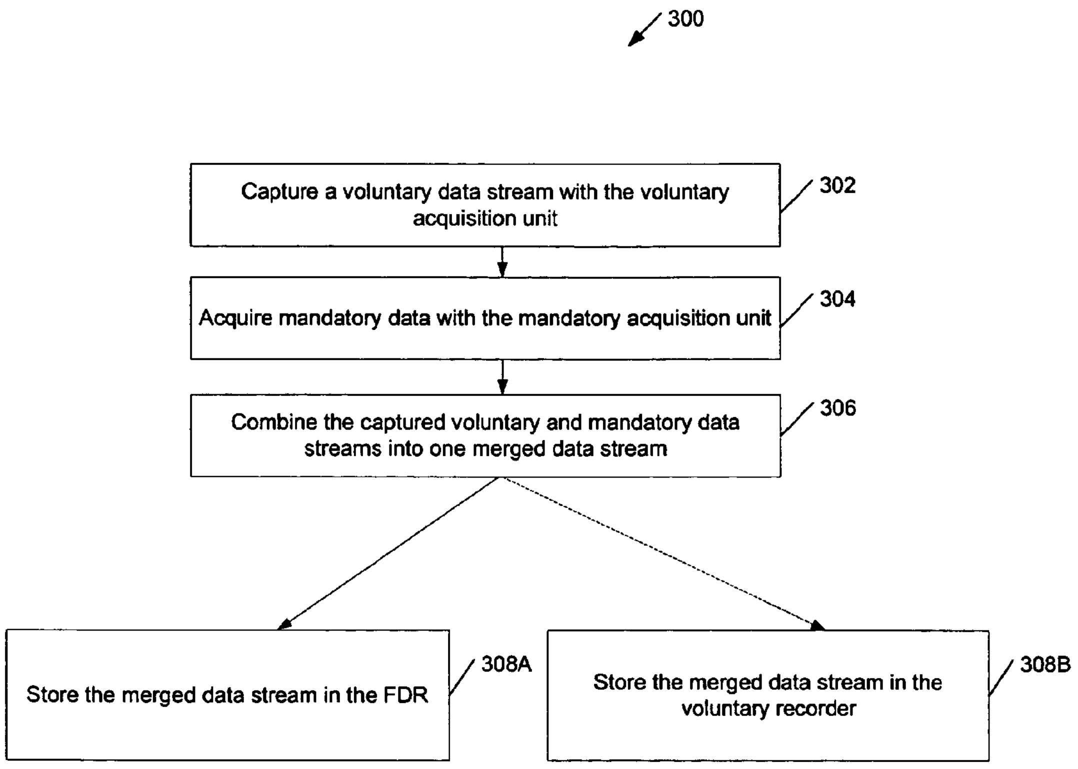
FIG. 7 is one embodiment of a flow diagram illustrating a method of constructing a merged data stream comprising at least one voluntary data stream and at least one mandatory data stream.

FIG. 7 is a flow diagram 300 that illustrates a method of constructing a merged data stream 214 comprising at least one voluntary data stream 202 and mandatory data 204. At block 302, the voluntary data stream 202 is captured by the voluntary acquisition unit 206, for example. At block 304, the mandatory data 204 is acquired by the mandatory acquisition 208, for example. At block 306, the captured voluntary data stream 202 and mandatory data 204 are combined into a single merged data stream 214. At block 308A, the merged data stream 214 is stored in the FDR 210. Alternatively, and/or simultaneously, at block 308B, the merged data may be stored in the optional voluntary recorder 212.

In one embodiment, the system 200 also may be used for acquiring aircraft data parameters where the sampling function is disassociated from the data recording function and where the aircraft data parameters are acquired and recorded over predetermined time units as described with reference to FIGS. 1-6. Those skilled in the art will appreciate, however, that conventional aircraft data recording systems also may be used to for acquiring aircraft data parameters where the sampling function is disassociated from the data recording function without departing from the scope of the claimed invention.

While embodiments of the present invention have been described in conjunction with its presently contemplated best mode, it is clear that it is susceptible to various modifications, modes of operation, and other embodiments, all within the ability of those skilled in the art and without exercise of further inventive activity. Further, while embodiments of the present invention have been described in connection with what is presently considered the most practical and preferred embodiments, it is to be understood that the invention is not limited to the disclosed embodiments, but on the contrary, it is intended to cover various modifications and equivalent arrangements included within the scope of the appended claims.

What is claimed is:

1. A system for recording aircraft parameter data, the system comprising:

a voluntary data acquisition unit for acquiring voluntary parameters describing the aircraft and forming a voluntary data stream comprising the parameters describing the aircraft;

a mandatory data acquisition unit in communication therewith for receiving the voluntary data stream and combining the voluntary data stream with the mandatory parameters into a single merged data stream; and a flight data recorder in communication with the mandatory acquisition unit, wherein the flight data recorder is for storing the merged data stream;

wherein merging the voluntary data stream with the mandatory data comprises interlacing the mandatory parameters with the voluntary data stream such that the mandatory parameters have predetermined locations within the merged data stream, and wherein merging the voluntary data stream with the mandatory data stream does not require the re-certification of the flight data recorder.

2. The system of claim 1, wherein the mandatory data acquisition unit further comprises a first input port for receiving the voluntary data stream and a second input port for receiving the mandatory parameters.

3. The system of claim 2, wherein the first and second input ports are any one of a DIT429 and ARINC717 data port.

4. The system of claim 1, further comprising a voluntary data recorder in communication with the mandatory acquisition unit.

5. The system of claim 4, wherein the merged data stream is recorded in the voluntary data recorder in addition to the flight data recorder.

6. The system of claim 1, wherein the voluntary data acquisition unit is an ACMS/FOQA data acquisition unit.

7. A method for constructing a data stream, comprising:

receiving a voluntary data stream from a voluntary data acquisition unit, wherein the voluntary data stream comprises voluntary parameters describing the aircraft;

receiving a mandatory data stream, wherein the mandatory data stream comprises mandatory parameters describing the aircraft and required to be recorded by at least one government mandate, and wherein the voluntary parameters are not required to be recorded by the at least one government mandate;

merging the voluntary data stream and the mandatory data, wherein the merging comprises interlacing the mandatory parameters with the voluntary data stream such that the mandatory parameters have predetermined locations within the merged data stream;

storing the merged data stream in a flight data recorder;

wherein the merged data stream maintains the certification of the flight data recorder.

8. The method of claim 7, further comprising:

receiving the voluntary data stream from a voluntary acquisition unit configured to acquire parameters making up the voluntary data stream and form the voluntary data stream; and receiving the mandatory data stream from a mandatory acquisition unit configured to acquire the mandatory parameters and form the mandatory data stream.

9. The method of claim 7, wherein merging the voluntary data stream and the mandatory data stream comprises merging the two data streams in the mandatory data acquisition unit.

10. The method of claim 7, further comprising storing the merged data stream in a voluntary data recorder.

* * * * *